(12) United States Patent
Li

(10) Patent No.: US 11,094,492 B2
(45) Date of Patent: Aug. 17, 2021

(54) FUSES, VEHICLE CIRCUIT FOR ELECTRIC VEHICLE AND ELECTRIC VEHICLE

(71) Applicant: COOPER XI'AN FUSE CO., LTD., Xi An (CN)

(72) Inventor: Xiaobo Li, Xi'an (CN)

(73) Assignee: COOPER XI'AN FUSE CO., LTD.

( * ) Notice: Subject to any disclaimer, the term of this patent is extended or adjusted under 35 U.S.C. 154(b) by 0 days.

(21) Appl. No.: 16/661,359

(22) Filed: Oct. 23, 2019

(65) Prior Publication Data

US 2020/0168424 A1    May 28, 2020

(30) Foreign Application Priority Data

Nov. 28, 2018 (CN) .......................... 201821980981.0

(51) Int. Cl.
| | |
|---|---|
| *H01H 85/42* | (2006.01) |
| *H01H 69/02* | (2006.01) |
| *H01H 85/08* | (2006.01) |
| *B60L 3/04* | (2006.01) |
| *H01H 85/20* | (2006.01) |
| *H01H 85/18* | (2006.01) |

(52) U.S. Cl.
CPC ............ *H01H 85/42* (2013.01); *H01H 69/02* (2013.01); *H01H 85/08* (2013.01); *B60L 3/04* (2013.01); *H01H 85/18* (2013.01); *H01H 85/203* (2013.01)

(58) Field of Classification Search
CPC ........ H01H 85/42; H01H 69/02; H01H 85/08; H01H 85/203; H01H 85/18; H01H 85/38; H01H 2085/388; B60L 3/04

USPC .......................................... 337/198, 273, 276
See application file for complete search history.

(56) References Cited

U.S. PATENT DOCUMENTS

| | | | | | |
|---|---|---|---|---|---|
| 4,611,192 | A | * | 9/1986 | Arora ................... | H01H 85/055 337/163 |
| 4,972,170 | A | * | 11/1990 | Ehlmann .............. | H01H 85/153 337/158 |
| 5,055,817 | A | * | 10/1991 | O'Shields ............. | H01H 85/08 337/161 |
| 5,345,210 | A | * | 9/1994 | Swensen ................ | H01H 85/38 337/163 |
| 5,357,234 | A | * | 10/1994 | Pimpis ................. | H01H 85/153 337/246 |
| 5,736,918 | A | * | 4/1998 | Douglass ............... | H01H 85/10 337/186 |

(Continued)

*Primary Examiner* — Stephen S Sul
(74) *Attorney, Agent, or Firm* — Stanek Lemon Crouse & Meeks, P.A.

(57) ABSTRACT

The present utility model relates to a fuse, a vehicle circuit for an electric vehicle, and an electric vehicle. The fuse has a longitudinal direction and a transverse direction, and includes: a bushing, having a through-hole cavity extending in the longitudinal direction and for accommodating quartz sand; a fuse body, accommodated in the through-hole cavity and having a plurality of openings spaced apart from each other in the transverse direction; and two contact blades, positioned at two ends of the through-hole cavity and each soldered to the fuse body by a conductive plate. An arc extinguishing medium layer is provided on the fuse body. A side edge of the arc extinguishing medium layer contacts edges of any two adjacent openings of the plurality of openings so as to cause the arc extinguishing medium layer to be close to a minimum transverse spacing between the two opening edges.

14 Claims, 2 Drawing Sheets

(56) References Cited

U.S. PATENT DOCUMENTS

| | | | | |
|---|---|---|---|---|
| 5,770,994 | A * | 6/1998 | Evans | H01H 85/10 337/159 |
| 6,194,989 | B1 * | 2/2001 | Douglass | H01H 85/10 337/228 |
| 6,507,265 | B1 * | 1/2003 | Ackermann | H01H 85/10 337/278 |
| 6,778,061 | B2 * | 8/2004 | Nakano | H01H 85/157 337/186 |
| 8,587,401 | B2 * | 11/2013 | Tong | H01H 85/044 337/407 |
| 2008/0122571 | A1 * | 5/2008 | Buchanan | H01H 85/18 337/276 |
| 2008/0191832 | A1 * | 8/2008 | Tsai | H01H 85/046 337/297 |
| 2015/0348731 | A1 * | 12/2015 | Douglass | H01H 85/175 337/198 |
| 2015/0348732 | A1 * | 12/2015 | Douglass | H01H 69/02 337/198 |
| 2015/0371803 | A1 * | 12/2015 | Hosomizo | H01H 85/12 337/142 |
| 2016/0141138 | A1 * | 5/2016 | Schlaak | H01H 85/185 337/231 |
| 2017/0365434 | A1 * | 12/2017 | Douglass | H01H 85/12 |
| 2018/0122606 | A1 * | 5/2018 | Ando | H01H 85/143 |
| 2019/0362924 | A1 * | 11/2019 | Zhou | H01H 85/165 |

* cited by examiner

FUSES, VEHICLE CIRCUIT FOR ELECTRIC VEHICLE AND ELECTRIC VEHICLE

CROSS-REFERENCE TO RELATED APPLICATIONS

The present application claims priority to Chinese Patent Application No. 201821980981.0; died Nov. 28, 2018, entitled FUSE, VEHICLE CIRCUIT FOR ELECTRIC VEHICLE, AND ELECTRIC VEHICLE, the disclosure of which is incorporated herein by reference in its entirety.

TECHNICAL FIELD

The present utility model relates to the technical field of electric vehicles, and in particular to a fuse, a vehicle circuit for an electric vehicle, and an electric vehicle.

BACKGROUND

Providing short-circuit protection or overload protection currently requires connecting a fuse to a vehicle circuit of an electric vehicle. Conventional industrial fuses (for example, a fuse for protecting a semiconductor device or apparatus) are presently used by automotive manufacturers to protect electric vehicles. These conventional fuses are usually applicable to be mounted in an operating environment that is spacious, allows heat dissipation, constant, and has a stable current and voltage load with lithe to no shock. Conventional fuses thus do not meet the requirements for mounting in electric vehicles because the operating environment involves limited internal mounting space, the fuse is subjected to repeated shocks and vibrations under high temperature and high humidity, and fluctuations of the current load.

The industry has conducted studies regarding fuses for electric vehicles. Among the studies, improving the arc extinguishing capability of the fuses is an urgent problem to be solved.

SUMMARY

The present utility model aims to provide a fuse having improved arc extinguishing capability.

The present utility model further aims to provide a vehicle circuit for an electric vehicle employing the above fuse.

The present utility model further aims to provide an electric vehicle employing the above vehicle circuit.

According to one aspect of the present utility model, a fuse is provided, the fuse having a longitudinal direction and a transverse direction, and the fuse comprising: a bushing, having a through-hole cavity extending in the longitudinal direction and for accommodating quartz sand; a fuse body, accommodated in the through-hole cavity and having a plurality of openings spaced apart from each other in the transverse direction; and two contact blades, positioned at two ends of the through-hole cavity and each soldered to the fuse body by a conductive plate, wherein an arc extinguishing medium layer is provided on the fuse body, and a side edge of the arc extinguishing medium layer contacts edges of any two adjacent openings of the plurality of openings so as to cause the arc extinguishing medium layer to be close to a minimum transverse spacing between the two opening edges.

Preferably, a transverse length of the arc extinguishing medium layer is equal to a transverse length of the fuse body.

Preferably, the plurality of openings have, in the longitudinal direction, one side relatively close to a longitudinal center of the fuse and the other side relatively away from the longitudinal center of the fuse, and the arc extinguishing medium layer is provided on the other side of the plurality of openings.

Preferably, the arc extinguishing medium layer is formed by coating the fuse body with an arc extinguishing medium, and the arc extinguishing medium comprises at least an organic adhesive.

Preferably, the plurality of openings comprise a circular hole and/or an arc-shaped slot, and an edge of the arc extinguishing medium layer is tangent to or intersects an edge of the circular hole and/or the arc-shaped slot.

Preferably, the fuse comprises two conductive plates; the two conductive plates respectively correspond to two opposite ends of the fuse body in the longitudinal direction, are provided in the through-hole cavity of the bushing, and are joined to the fuse body; each of the two contact blades passes through a corresponding conductive plate, and is joined to the fuse body; and an inner cavity defined by the bushing and the two conductive plates is filled with the quartz sand.

Preferably, two longitudinal opposite ends of the bushing are further provided with two cover plates; the two cover, plates are fixed on the bushing on sides of the two conductive plates and facing away from the through-hole cavity; and each of the two contact blades passes through a corresponding cover plate and a corresponding conductive plate, and is connected to the fuse body.

According to another aspect of the present utility model, a vehicle circuit for an electric vehicle is provided, and comprises a fuse connected to the vehicle circuit, wherein the fuse is the above fuse.

According to still another aspect of the present utility model, an electric vehicle is provided, and comprises a vehicle circuit, wherein the vehicle circuit is the above vehicle circuit for the electric vehicle.

Part of the other features and advantages of the present utility model will be obvious to a person skilled in the art after reading the present application, and the rest will be described in the following detailed description with reference to the accompanying drawings.

BRIEF DESCRIPTION OF THE DRAWINGS

Embodiments of the present utility model are described in detail below with reference to the accompanying drawings, wherein.

DESCRIPTION OF THE REFERENCE NUMERALS

Figure 1:
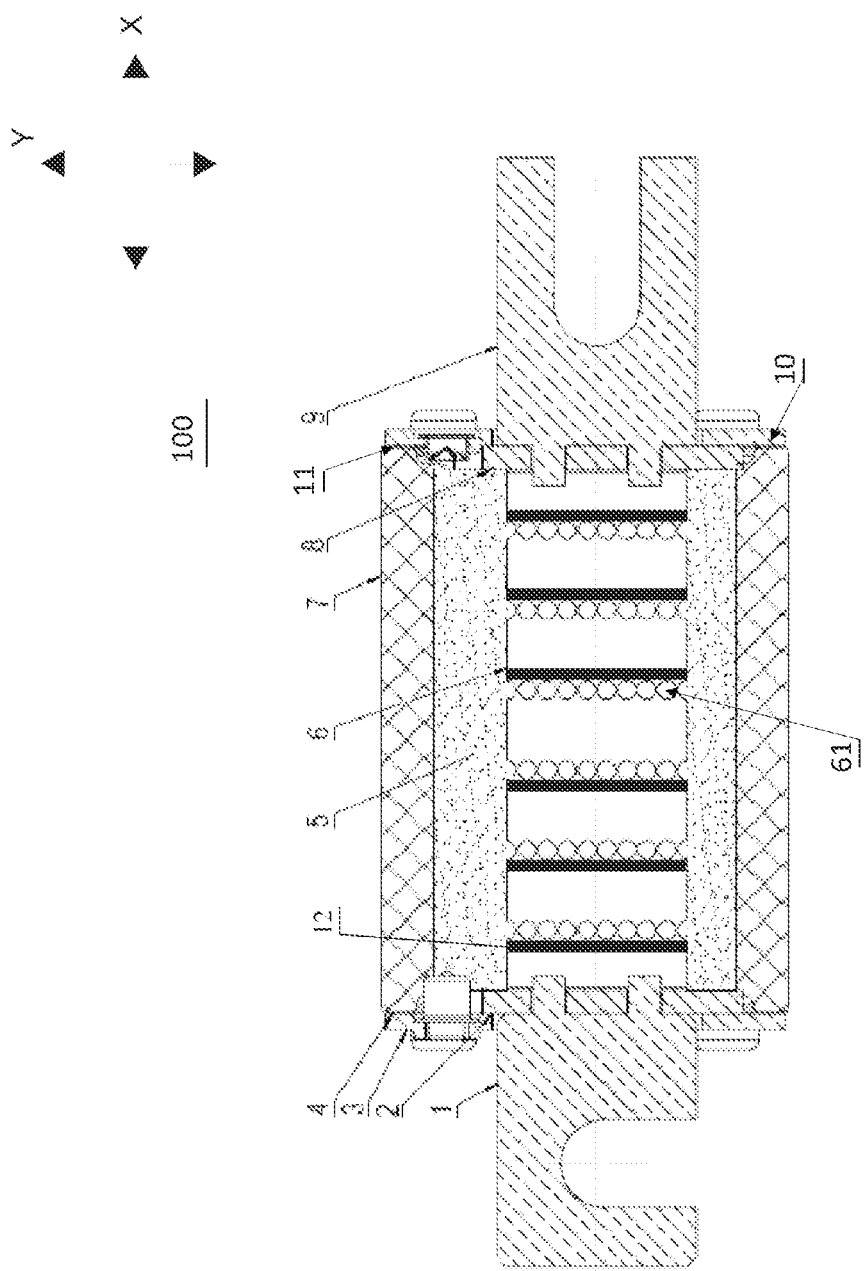
FIG. 1 is a schematic view of a fuse according to an embodiment of the present utility model.

1. Contact blade
2. Conductive plate
3. Cover plate
4. Sealing gasket
5. Quartz sand (containing a certain proportion of curing agent)
6. Fuse body
7. Bushing
8. Conductive plate
9. Contact blade 10. Cover plate
11. Sealing gasket
12. Arc extinguishing medium layer
100. Fuse
X. Longitudinal direction
Y. Transverse direction
h. Minimum transverse spacing

DETAILED DESCRIPTION

A schematic scheme of the device disclosed by the present utility model is described in detail with reference to the accompanying drawings. Although the purpose of providing the accompanying drawings is to present some implementations of the present utility model, the accompanying drawings do not need to be drawn according to the size of the specific implementations. Certain features can be enlarged, removed, or partially cross-sectioned to better illustrate and explain the disclosure of the present utility model. Part of members in the accompanying drawings can be positionally adjusted according to actual requirements without affecting the technical effect. In the description, the term "in the accompanying drawings" or similar terms do not necessary refer to all of the accompanying drawings or examples.

Some directional terms used in the following to describe the accompanying drawings, such as "in," "out," "upper," and "lower," and other directional terms are construed as having normal meanings thereof and refer to those directions involved when the accompanying drawings are viewed normally. Unless otherwise specified, the directional terms in the description are, substantially in accord with conventional directions understood by a person skilled in the art.

The terms "first," "first one," "second," and "second one" and similar terms used in the present utility model do not indicate any sequence, number, or importance in the present utility model, and are used only to distinguish one component from other components.

FIG. 1 shows an exemplary embodiment of a fuse of the present utility model. The fuse in this example is applicable to, for example, a circuit having a rated voltage of 1000 V and a rated current not greater than 550 A (for example, a vehicle circuit of a household electric vehicle), and is for short-circuit protection for a battery pack, a maintenance switch, and other charging and discharging circuits and for overload protection for some cases in which overcurrent is not allowed.

As shown in FIG. 1, the fuse is denoted by the reference numeral 100; a direction X indicates a longitudinal direction (or a lengthwise direction) of the fuse, and a direction Y indicates a transverse direction (or a widthwise direction) of the fuse. In the illustrated embodiment, the fuse 100 includes a bushing 7 having a through-hole cavity extending in the longitudinal direction X, a fuse body 6 accommodated in the through-hole cavity, two contact blades 1 and 9 joined to two opposite ends of the fuse body 6 in the longitudinal direction X, two conductive plates 2 and 8 covering two opposite ends of the through-hole cavity, quartz sand 5 with which an inner cavity defined by the two conductive plates 2 and 8 and the bushing 7 is filled, and two cover plates 3 and 10 fixed on end portions of the bushing 7 on outer sides of the two conductive plates 2 and 8.

The two cover plates 3 and 10 can be fixed to the bushing 7 using screws (for example, self-tapping screws). In order to improve a sealing effect, a sealing gasket 4 can be provided between an end surface of the bushing 7 and the corresponding cover plate 3, and a sealing gasket 11 can be provided between the end surface of the bushing 7 and the corresponding cover plate 10. The bushing 7 can be selected from a porcelain tube, an epoxy glass tube, and a composite tube. The porcelain tube is particularly suitable for a fuse connected to a circuit with a rated voltage of 1000 V and a rated current not greater than 550 A. The cover plates 3 and 10 and the screws can both be made from stainless steel, and can meet the requirements of resisting erosion caused by a salt-containing vapor and high temperature moisture.

Figure 2:
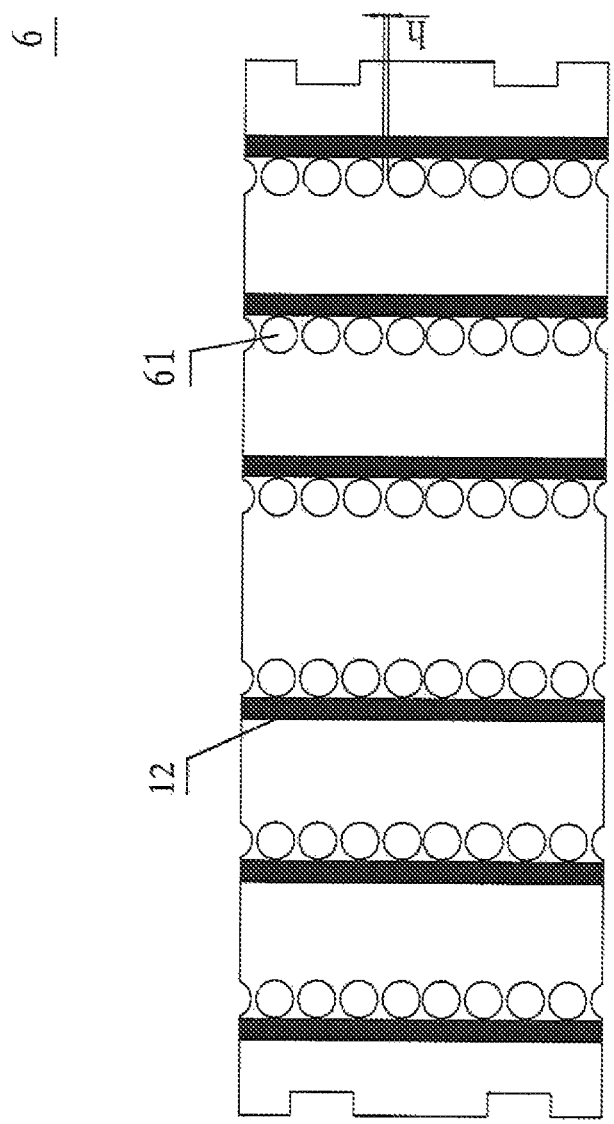
FIG. 2 is a schematic view of a fuse body according to an embodiment of the present utility model.

In the embodiments illustrated in FIGS. 1 and 2, the fuse body 6 is an elongated sheet having a variable cross section. The fuse body 6 can be made from a material selected from copper, a copper-silver composite, and pure silver. Pure silver is a desirable selection for preparing the fuse body 6 because of the low electrical resistance, low melting point, and oxidation resistance properties thereof. Six opening groups spaced apart from each other in the longitudinal direction X are formed on the fuse body 6. Each opening group includes ten openings 61 spaced apart from each other in the transverse direction Y. The "spaced apart from each other In the transverse direction Y" herein includes the case in which a line connecting centers of all of the openings in each opening group is parallel to the transverse direction Y and the case in which the line connecting the centers of all of the openings is slightly inclined at an angle (for example, ±10°) relative to the transverse direction Y. As shown in FIG. 1 and FIG. 2, among the ten openings 61 of each transverse opening group, two outermost openings 61 are arc-shaped slots, and the other eight openings 61 are circular holes. Certainly, the number of opening groups and the number of openings included in each opening group can be increased or reduced according to actual requirements (for example, a preset voltage and a preset current). The edge of each opening 61 is arc-shaped. A minimum transverse spacing h exists between edges of two openings 61 adjacent to each other in the transverse direction. The minimum transverse spacing h can also be referred to as a "narrow path," and the dimension thereof is less than 1 mm, such as 0.16 mm, or 0.2 mm. The fuse body 6 is coated with an organic adhesive, so as to form an arc extinguishing medium layer 12, and the arc extinguishing medium layer 12 needs to be as close as possible to the narrow path. In the illustrated embodiment, the opening 61 is a circular hole or an arc-shaped slot, and a side edge of the arc extinguishing medium layer 12 close to the opening 61 is tangent to the edge of the opening 61, so as to achieve the purpose of causing the arc extinguishing medium layer 12 to be as close as possible to the narrow path. In addition, the side edge of the arc extinguishing medium layer 12 can also intersect the edge of the opening 61, such that the arc extinguishing medium layer 12 is as close as possible to the narrow path. No matter whether the arc extinguishing medium layer 12 is tangent to or intersects the edge of the opening 61, this positioning is an indication that the side edge of the arc extinguishing medium layer 12 contacts the edge of the opening 61.

The circular hole or the arc-shaped slot is only an example of the opening 61. The opening 61 can also be in another shape, for example, an ellipse, a triangle, a diamond, a star, or another special shape, and the shape of each opening in each opening group can be different.

Providing the arc extinguishing medium layer in a position as close as possible to the narrow path can improve a breaking capacity of the fuse. The principle of breaking capacity of a fuse is as follows: when the fuse breaks a short circuit fault current, the first position where fusing and an arc occur is the narrow path. If the arc cannot be extinguished quickly, then the arc will be released from the fuse, or a fuse housing will explode. The organic adhesive contained in the arc extinguishing medium layer can decompose due to the high temperature of the arc, so as to generate gas, and the gas can force charged particles to enter the quartz sand to undergo cooling and deionization. The gas generated by means of decomposition increases the pressure of the inner cavity of the housing, thereby further deionizing the charged particles. The process of deionizing the charged particles is the process of arc extinguishing.

The organic adhesive needs to be applied in a position as close as possible to the narrow path. If the organic adhesive is far away from the narrow path, then arc burning will last for a longer period of time, and the fuse may have released an arc or exploded before the organic adhesive decomposes and functions. However, it should be noted that the organic adhesive cannot be applied to the narrow path, and the coating of the organic adhesive needs to avoid the narrow path; if the organic adhesive is applied to the narrow path, then a high temperature caused when the fuse operates normally or is slightly overloaded may cause the organic adhesive to be consumed in advance, thereby deteriorating the arc extinguishing effect; in addition, the organic adhesive will prevent the narrow path from contacting the quartz sand, and hinder normal circulation in the narrow path and heat conduction of the quartz sand, thereby causing the temperature of the fuse to rise.

In the illustrated embodiment, the organic adhesive is applied as an arc extinguishing medium to a position as close as possible to the narrow path to improve the breaking capacity of the fuse. However, a person skilled in the art can conceive of the following: an applicable arc extinguishing medium is not limited to the organic adhesive; all other insulation materials capable of generating gas by means of decomposition due to the high temperature of the arc can be applied as an arc extinguishing medium to the fuse body so as to form the arc extinguishing medium layer; and the other arc extinguishing media can also be used by being mixed with the organic adhesive. All of the materials (for example, the organic adhesive) and the processes (for example, coating the fuse body with the organic adhesive) involved in the present utility model are conventional, and the present utility model does not involve any improvements in materials and processes.

In the illustrated embodiment, the arc extinguishing medium layer is provided on a side of each opening group relatively away from, in the longitudinal direction X, a longitudinal center of the fuse 100, such that the gas generated by means of decomposition of the organic adhesive can force the arc to be "blown" to a longitudinal middle portion of the fuse 100, thereby preventing the arc from being "blown" to the cover plates 3 and 10 and the contact blades 1 and 9, and preventing the ease in which the quartz sand undergoes breakdown caused by the arc since the amount of quartz sand at two longitudinal ends of the fuse 100 is less than the amount of quartz sand in the longitudinal middle portion. However, such a case does not mean that the arc extinguishing medium layer can be provided only on the side of the opening group shown in the drawings. In other cases, the arc extinguishing medium layer can also be provided on the other side of the opening group, or arc extinguishing medium layers are provided on, both two longitudinal opposite sides of the opening group. However, it should be noted that the amount of organic adhesive is preferably not overly large. If the amount is overly large, then the decomposition of the organic adhesive generates too much gas, such that the pressure of the inner cavity of the fuse is so high as to cause the fuse to crack.

In the illustrated embodiment, the arc extinguishing medium layer 12 is strip-shaped, and the length thereof in the transverse direction Y is approximately equal to the length of the fuse body 6 in the transverse direction Y. However, a person skilled in the art can also conceive of the following: the length of the arc extinguishing medium layer 12 in the transverse direction Y can be less than the length of the fuse body 6 in the transverse direction Y, as long as the arc extinguishing medium layer is provided close to a narrow path between each two adjacent openings in each opening group.

The two conductive plates 2 and 8 are respectively positioned at two opposite ends of the fuse body 6 in the longitudinal direction X, and are jointed (such as by soldering) to the fuse body 6 to form a whole. The conductive plates 2 and 8 can also be fixedly connected to the cover plates 3 and 10 of corresponding ends using screws.

During an assembly process, each of the above screws can be coated with an adhesive (for example, a thread locking adhesive) to vibration and shock resistance, requirements.

The two contact blades 1 and 9 are respectively fixedly mounted on the two cover plates 3 and 8 using screws. The contact blade 1 passes through a cavity through-hole on the cover plate 3, is riveted to the conductive plate 2, and is joined to one longitudinal end of the fuse body 6, and the contact blade 9 passes through a cavity through-hole on the cover plate 10, is riveted to the conductive plate 8, and is joined to the other longitudinal end of the fuse body 6. The two contact blades 1 and 9 can be joined to the fuse body 6 by means of, for example, soldering (for example, point-to-point soldering). Although FIG. 1 shows that the contact blade 1 is a hook-shaped contact blade and the contact blade 9 is a fork-shaped contact blade, a person skilled in the art can understand that the specific shape of the contact blade can be adjusted according to actual requirements (for example, mounting requirements). For example, both the contact blades 1 and 9 can be hook-shaped contact blades, or both the contact blades 1 and 9 can be fork-shaped contact blades.

Taking the fuse 100 in FIG. 1 as an example, an assembly process thereof includes:
1. riveting the contact blade 1 to the conductive plate 2;
2. riveting the contact blade 9 to the conductive plate 8;
3. using a fixture to solder one end of the fuse body 6 coated with the arc extinguishing medium layer 12 to a riveted joint member formed by the contact blade 1 and the conductive plate 2;
4. using a fixture to solder the other end of the fuse body 6 coated with the arc extinguishing medium layer 12 to a riveted joint member formed by the contact blade 9 and the conductive plate 8;
5. sleeving the bushing 7 on a soldered whole member formed by the above steps 1-4 where the diameters of the conductive plates 2 and 8 are smaller than an inner diameter of the through-hole cavity of the bushing 7;
6. using a fixture to sleeve the sealing gasket 4 and the cover plate 3 and the sealing gasket 11 and the cover plate 10 respectively on two sides of the bushing 7, using screws to fix the cover plates 3 and 10 to the two ends of the bushing 7, and using screws to fixing the two conductive plates 2 and 8 to the cover, plates 3 and 10, such that the entire fuse forms a whole;
7. using a solid plug to block reserved filling ports on the cover plate 3 and the conductive plate 2, and filling the inner cavity with the quartz sand 5 via reserved filling ports on the cover plate 10 and the conductive plate 8, where it should be noted that the inner cavity cannot be filled with the quart sand 5 before the arc extinguishing medium layer 12 is solidified;
8. using another plug having a vent hole to block the reserved filling ports on the cover plate 10 and the conductive plate 8; and
9. placing the entire fuse in a solidification oven to solidify the quartz sand in the entire fuse by means of high temperature, high humidity, and negative pressure.

The above fuse employs a fully-sealed structure and a fuse body having an organic arc extinguishing material, and can fully meet the following requirements as demanded due to the operating environment of an electric vehicle: internal space is limited; a use environment is harsh; a temperature rise is small; and a large faulty current needs to be broken. The fuse can effectively protect a vehicle circuit and other components.

It should be appreciated that although the description is presented according to each embodiment, each embodiment does not necessarily include only one independent technical solution. The presentation manner of the description is merely for the purpose of clarity, and those skilled in the art should regard the description as a whole, and the technical solutions in the embodiments can also be appropriately combined to form other implementations comprehensible by a person skilled in the art.

What is described above is merely exemplary specific implementations of the present utility model, but is not intended to limit the scope of the present utility model. Any equivalent change, modification, or combination made by a person skilled in the art without departing from the conception and principle of the present utility model shall fail within the protection scope of the present utility model.

The invention claimed is:

1. A fuse, having a longitudinal direction and a transverse direction, the fuse comprising:
   a bushing having a through-hole cavity extending in the longitudinal direction;
   a fuse body accommodated in the through-hole cavity and having a plurality of openings spaced apart from each other in the transverse direction;
   an arc extinguishing medium layer on the fuse body and having a side edge that contacts edges of any two adjacent openings of the plurality of openings so as to cause the arc extinguishing medium layer to be close to a minimum transverse spacing between the two opening edges;
   first and second conductive plates positioned in the through-hole cavity at opposite ends of the bushing and joined to respective opposite ends of the fuse body;
   first and second contact blades passing through respective ones of the first and second conductive plates and joined to the opposite ends of the fuse body;
   first and second cover plates on respective ones of the first and second conductive plates and secured to respective ones of the opposite ends of the bushing by respective screws, wherein the first and second contact blades pass through respective ones of the first and second cover plates; and
   a quartz sand in a space defined by the bushing and the first and second conductive plates.

2. The fuse according to claim 1, wherein a transverse length of the arc extinguishing medium layer is equal to a transverse length of the fuse body.

3. The fuse according to claim 1, wherein the plurality of openings have, in the longitudinal direction, one side relatively close to a longitudinal center of the fuse and another side relatively away from the longitudinal center of the fuse, and the arc extinguishing medium layer is provided on the other side of the plurality of openings.

4. The fuse according to claim 1, wherein the arc extinguishing medium layer is formed by coating the fuse body with an arc extinguishing medium, and the arc extinguishing medium comprises at least an organic adhesive.

5. The fuse according to claim 1, wherein the plurality of openings comprise a circular hole and/or an arc-shaped slot, and an edge of the arc extinguishing medium layer is tangent to or intersects an edge of the circular hole and/or the arc-shaped slot.

6. A vehicle circuit the fuse according to claim 1.

7. An electric vehicle, comprising the vehicle circuit according to claim 6.

8. A fuse comprising:
   a housing having a cavity therein;
   a conductor in the cavity and having spaced-apart first and second rows of circular holes therethrough;
   an arc extinguishing material region on the conductor and having a linear edge tangential to adjacent circular holes of one of the spaced-apart first and second rows of circular holes, wherein the arc extinguishing material region does not extend past the linear edge and does not overlap with the circular holes of the one of the spaced-apart first and second rows of circular holes; and
   a quartz-containing material in the cavity and surrounding the conductor.

9. The fuse of claim 8, wherein the conductor comprises a conductive sheet, wherein the spaced-apart first and second rows of circular holes are each aligned along a direction transverse to a line between first and second ends of the conductive sheet, and wherein the arc extinguishing material region comprises respective first and second portions of arc extinguishing material on the conductive sheet adjacent to respective one of the spaced-apart first and second rows of holes.

10. The fuse of claim 9, wherein the arc extinguishing material comprises an organic adhesive and wherein the quartz-containing material comprises a quartz sand.

11. The fuse of claim 8:
    wherein the housing comprises an elongate bushing;
    wherein the cavity comprises a bore of the elongate bushing;
    wherein the conductor comprises an elongate conductive sheet extending longitudinally within the bore of the elongate bushing;
    wherein the spaced-apart first and second rows of holes are each aligned along a direction transverse to a longitudinal axis of the conductive sheet;
    wherein the arc extinguishing material comprises respective strips of an organic adhesive on the conductive sheet and extending parallel to the spaced-apart first and second rows of holes; and
    wherein the quartz-containing material comprises a quartz sand surrounding the conductive sheet.

12. The fuse of claim 8, further comprising first and second contact blades electrically connected to respective first and second ends of the conductor.

13. A fuse comprising:
    an elongate bushing;
    a conductor extending in a lengthwise direction in a bore of the bushing and having a plurality of rows of circular holes spaced apart along the lengthwise direction;
    respective strips of organic adhesive disposed adjacent respective rows of the plurality or rows of circular holes and having linear edges tangential to adjacent circular holes of the plurality of rows of circular holes, wherein the respective strips of organic adhesive do not extend past the linear edges and do not overlap with the respective rows of the plurality of rows of circular holes; and a quartz sand contained in the bore and surrounding the conductor.

14. The fuse of claim 13, further comprising first and second contact blades attached to respective first and second ends of the bushing and electrically coupled to respective first and second ends of the conductor.

* * * * *

UNITED STATES PATENT AND TRADEMARK OFFICE
CERTIFICATE OF CORRECTION

| | |
|---|---|
| PATENT NO. | : 11,094,492 B2 |
| APPLICATION NO. | : 16/661359 |
| DATED | : August 17, 2021 |
| INVENTOR(S) | : Xiaobo Li |

It is certified that error appears in the above-identified patent and that said Letters Patent is hereby corrected as shown below:

On the Title Page

(73) Assignee: Please include the country of the Assignee to read -- COOPER XI'AN FUSE CO., LTD. (CN) --

In the Specification

Column 1, Line 8: Please correct "died November 28, 2018" to read -- filed November 28, 2018 --

Signed and Sealed this
Twenty-sixth Day of April, 2022

Katherine Kelly Vidal
*Director of the United States Patent and Trademark Office*